Aug. 20, 1929. T. C. HOLMES 1,725,191

TOOL FOR REMOVING DANDELIONS AND SIMILAR WEEDS

Filed Aug. 19, 1927

INVENTOR
T. C. Holmes.
By Bakewell & Church
ATTORNEYS

Patented Aug. 20, 1929.

1,725,191

UNITED STATES PATENT OFFICE.

THOMAS C. HOLMES, OF SAN FRANCISCO, CALIFORNIA, ASSIGNOR TO OSCAR J. SCHROETER, OF ST. LOUIS, MISSOURI.

TOOL FOR REMOVING DANDELIONS AND SIMILAR WEEDS.

Application filed August 19, 1927. Serial No. 214,111.

This invention relates to a dandelion weeder, and has for its main object to provide a tool for removing dandelions and similar weeds, that is easy to operate and which will effectively remove such weeds from golf greens and lawns without marring the sod or forming an objectionable hole that produces a bare spot in the grass.

Another object is to provide a device of the character above referred to, that is inexpensive to manufacture, that is light in weight and small enough to be conveniently carried in the user's pocket, and which is of such construction that it will protect the user's hand and tend to prevent the user's knuckles from coming in contact with the ground in the operation of prying up a weed.

Figure 1 of the drawings is a side elevational view of my improved tool, illustrating the method of using the tool.

Figure 3:
Figure 3 is a detail sectional view, taken on the line 3—3 of Figure 2.
Figure 2:
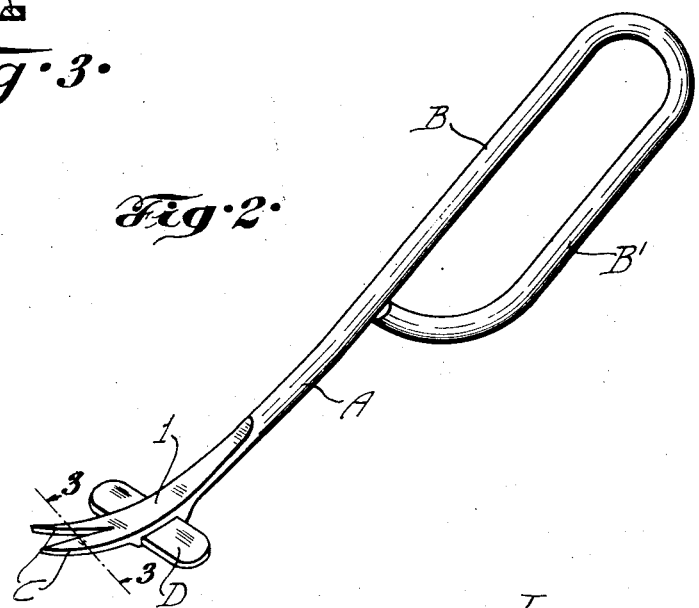
Figure 2 is a perspective view of the tool.

Referring to the drawings which illustrate the preferred form of my invention, A designates the shank of the tool which is provided at its upper end with a handle B and provided at its lower end with a pair of sharp pointed prongs C that are disposed at an angle to the shank A and which are adapted to be inserted in the ground so as to straddle or embrace the root portion of the weed that is being removed. In close proximity to the base end or inner end of the prongs C is a transversely-disposed fulcrum member D which is preferably offset slightly with relation to the underside of the prongs C, so that when the tool is rocked on the fulcrum member D as a bearing, the prongs C will exert practically a direct upward pull on the weed, and thus draw the roots of the weed out of the ground intact or without breaking off said roots. In the form of my invention herein illustrated the shank A is provided at its lower end with a relatively thin curved portion 1 that is slotted so as to form the prongs C, and the inner edges or adjacent edges of said prongs are beveled oppositely to each other, as shown in Figure 3, so as to produce a V-shaped space between said prongs which is of greatest width at the top side of the prongs.

The size or dimensions of the prongs C may vary, but I have found that if said prongs are made approximately one-eighth of an inch in thickness, approximately one-half an inch in length and with a space of approximately one-fourth of an inch between the points of the prongs, that the tool can be used for removing dandelions and similar weeds from sod without marring the sod or producing an objectionable hole that detracts from the appearance of the grass. The fulcrum member D may vary, both in shape and in dimensions, but I have found that if said fulcrum member is constructed in the form of a flat bar of approximately one-fourth of an inch in thickness, approximately one-half of an inch in width and about one and one-half or two inches long, that said member has a sufficient bearing area on the ground to prevent it from sinking into the ground when the tool is rocked on said member in a direction to cause the prongs C to pry up the weed.

The fulcrum member D can either be formed integral with the curved portion 1 of the tool, or it can consist of a separate element arranged in a notch on the underside of said curved portion and permanently connected to same by a fastening device or by a welding or brazing operation. The handle B at the upper end of the shank of the tool is preferably provided with a guard B' that extends over the portions of the user's fingers which grasp the handle, and thus tends to protect the user's hand and prevents the user's knuckles from striking against the ground during the operation of removing a weed.

Figure 1:
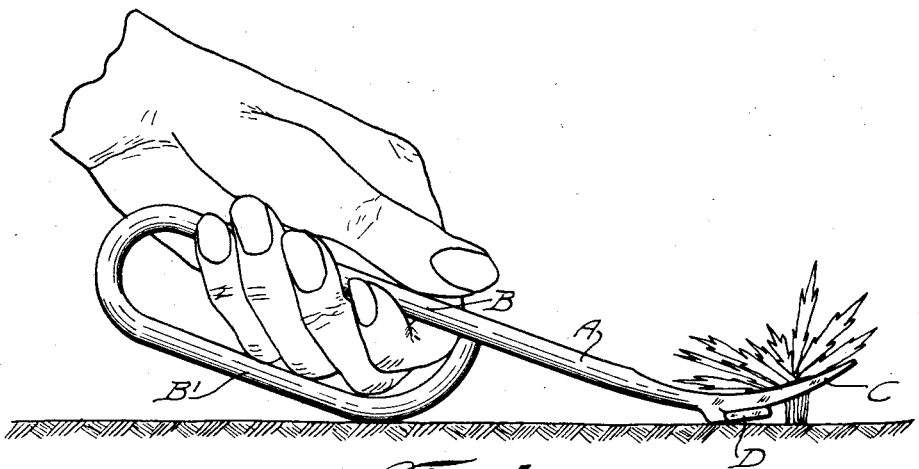

In order that the tool will be compact, light in weight, inexpensive to manufacture and rugged enough to successfully withstand a considerable strain in the operation of prying a weed out of the ground, I prefer to form the tool from a piece of round steel rod that is bent to form a loop-shaped handle in which the user's fingers can be inserted, as shown in Figure 1, one end of said rod being deformed by a swaging or forging operation so as to produce a relatively thin curved portion 1 and substantially flat, sharp-pointed prongs which merge into said curved portion.

Having thus described my invention, what

I claim as new and desire to secure by Letters Patent is:

A tool for removing dandelions and similar weeds, formed from a round rod that is bent so as to form a loop-shaped handle at the upper end of a shank into which the user's fingers are adapted to be inserted an angularly-disposed flattened portion at the lower end of said rod, a bifurcation in said flattened portion that constitutes a pair of sharp pointed prongs, and a transversely-disposed flat bar connected to said flattened portion on the underside of same so as to serve as a fulcrum member.

THOMAS C. HOLMES.